United States Patent
Malvar Maua et al.

(10) Patent No.: US 12,217,502 B2
(45) Date of Patent: Feb. 4, 2025

(54) ATMOSPHERIC CHEMICAL SPECIES DETECTION USING MULTISPECTRAL IMAGING

(71) Applicant: Microsoft Technology Licensing, LLC, Redmond, WA (US)

(72) Inventors: Sara Malvar Maua, Sao Paulo (BR); Leonardo De Oliveira Nunes, Rio de Janeiro (BR); Roberto De Moura Estevao Filho, Teresopolis (BR); Yagna Deepika Oruganti, Houston, TX (US); Anirudh Badam, Issaquah, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 426 days.

(21) Appl. No.: 17/804,815

(22) Filed: May 31, 2022

(65) Prior Publication Data
US 2023/0316745 A1  Oct. 5, 2023

Related U.S. Application Data

(60) Provisional application No. 63/362,184, filed on Mar. 30, 2022.

(51) Int. Cl.
*G06V 20/10* (2022.01)
*G06N 3/08* (2023.01)
(Continued)

(52) U.S. Cl.
CPC ............ *G06V 20/194* (2022.01); *G06N 3/08* (2013.01); *G06V 10/58* (2022.01); *G06V 10/60* (2022.01)

(58) Field of Classification Search
None
See application file for complete search history.

(56) References Cited

U.S. PATENT DOCUMENTS

2023/0111401 A1*  4/2023  Machover ............ G01N 21/359
                                                            73/23.2
2023/0282316 A1*  9/2023  Malvar Maua ........ G16C 20/80
                                                            706/12

FOREIGN PATENT DOCUMENTS

WO   WO-2023275583 A1 *  1/2023

OTHER PUBLICATIONS

Bonafoni S. et al., "Albedo Retrieval From Sentinel-2 by New Narrow-to-Broadband Conversion Coefficients", IEEE Geoscience and Remote Sensing Letters, vol. 17, No. 9, Sep. 2020, pp. 1618-1622 (Year: 2020).*

(Continued)

*Primary Examiner* — Dov Popovici
(74) *Attorney, Agent, or Firm* — Alleman Hall & Tuttle LLP (57) ABSTRACT

Techniques for optically detecting a subject chemical species within an atmospheric environment are disclosed. Image data is obtained representing multispectral imagery of a geographic region captured through the atmospheric environment. The image data includes an array of band-specific intensity values for each of a plurality of spectral bands, including a sample spectral band having increased sensitivity to the subject chemical species as compared to a plurality of reference spectral bands. A background reflectance map is generated that includes an array of inter-band intensity values in which each inter-band intensity value represents a filtered combination of band-specific intensity values of albedo-normalized arrays for a grouped subset of the plurality of reference spectral bands. The albedo-normalized array of band-specific intensity values for the sample spectral band is compared to the background reflectance map to obtain an index array of intensity variance values for the subject chemical species.

20 Claims, 5 Drawing Sheets

(51) Int. Cl.
*G06V 10/58* (2022.01)
*G06V 10/60* (2022.01)

(56) References Cited

OTHER PUBLICATIONS

Bonafoni, S. et al., "Albedo Retrieval From Sentinel-2 by New Narrow-to-Broadband Conversion Coefficients," IEEE Geoscience and Remote Sensing Letters, vol. 17, No. 9, Jan. 29, 2020, 5 pages.

* cited by examiner

FIG. 1

| SPATIAL RESOLUTION (m) | BAND NUMBER | S2A | | S2B | |
|---|---|---|---|---|---|
| | | CENTRAL WAVELENGTH (nm) | BAND WIDTH (nm) | CENTRAL WAVELENGTH (nm) | BAND WIDTH (nm) |
| 10 | 2 | 492.4 | 66 | 492.1 | 66 |
| | 3 | 559.8 | 36 | 559.0 | 36 |
| | 4 | 664.6 | 31 | 664.9 | 31 |
| | 8 | 832.8 | 106 | 832.9 | 106 |
| 20 | 5 | 704.1 | 15 | 703.8 | 16 |
| | 6 | 740.5 | 15 | 739.1 | 15 |
| | 7 | 782.8 | 20 | 779.7 | 20 |
| | 8a | 864.7 | 21 | 864.0 | 22 |
| | 11 | 1613.7 | 91 | 1610.4 | 94 |
| | 12 | 2202.4 | 175 | 2185.7 | 185 |
| 60 | 1 | 442.7 | 21 | 442.2 | 21 |
| | 9 | 945.1 | 20 | 943.2 | 21 |
| | 10 | 1373.5 | 31 | 1376.9 | 30 |

FIG. 2A

| EXAMPLE SPECTRAL BANDS FOR DETECTION OF METHANE AS SUBJECT CHEMICAL SPECIES | |
|---|---|
| REFERENCE SPECTRAL BANDS | 1-8, 8a, 9*, 10 |
| SAMPLE SPECTRAL BAND | 12 |
| QUASI-SENSITIVE SPECTRAL BAND | 11 |
| * BAND 9 MAY BE OMITTED FROM REFERENCE SPECTRAL BANDS IN SOME IMPLEMENTATIONS | |

$$a = \sum_{B=1}^{N} \rho_B \cdot w_B$$

FIG. 5A $$w_B = \frac{\int_{L_B}^{U_B} R_{s\lambda} \cdot d\lambda}{\int_{0.3}^{3} R_{s\lambda} \cdot d\lambda}$$

ATMOSPHERIC CHEMICAL SPECIES DETECTION USING MULTISPECTRAL IMAGING

CROSS REFERENCE TO RELATED APPLICATIONS

This application claims priority to U.S. Provisional Patent Application Ser. No. 63/362,184, filed Mar. 30, 2022, the entirety of which is hereby incorporated herein by reference for all purposes.

BACKGROUND

Satellite and aerial imagery can be used to observe terrestrial and other planetary surfaces for a variety of purposes. The revisit rate of these aeronautical vehicles and the type of on-board sensors can limit the availability and accuracy of surface and atmospheric observations. Extending data collected from these on-board sensors to new detection modalities may improve the availability and accuracy of surface and atmospheric observations.

SUMMARY

A subject chemical species within an atmospheric environment may be optically detected based on multispectral imagery of a geographic region captured through the atmospheric environment.

According to an example, a method performed by a computing system includes obtaining image data representing multispectral imagery. The image data, for example, includes an array of band-specific intensity values for each of a plurality of spectral bands, including a plurality of reference spectral bands and a sample spectral band having increased sensitivity to the subject chemical species as compared to the plurality of reference spectral bands.

The method further includes removing albedo background from the image data for each of the plurality of spectral bands to obtain a normalized array of band-specific intensity values for each of the plurality of spectral bands.

The method further includes generating a background reflectance map that includes an array of inter-band intensity values in which each inter-band intensity value represents a filtered combination of band-specific intensity values of the normalized arrays for a grouped subset of the plurality of reference spectral bands.

The method further includes comparing the normalized array of band-specific intensity values for the sample spectral band to the background reflectance map to obtain an index array of intensity variance values. The computing system outputs the index array for the subject chemical species, which may be used for a variety of downstream processes.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DETAILED DESCRIPTION

A subject chemical species within an atmospheric environment may be optically detected based on multispectral imagery of a geographic region captured through the atmospheric environment. An index array generated by the disclosed detection techniques is an example framework for identifying aerosols and atmospheric gas plumes of a subject chemical species based on multispectral imagery. As an example, the disclosed detection techniques can be used to identify methane super emitters in an unsupervised fashion.

The detection techniques disclosed herein can leverage multispectral imagery from existing aeronautical vehicles and their on-board sensors to new detection modalities previously unanticipated for these imaging platforms, thereby offering the potential improve the availability and accuracy of surface and atmospheric observations. Imaging data acquired from aeronautical vehicles with a relatively high revisit rate and variable resolution can be used to detect and track the presence or release of a subject chemical species within the atmospheric environment. For example, multispectral imagery from the Sentinel 2 program, which was not originally designed to identify gases, may be used to generate an index array for methane gas or other subject chemical species of interest. While the detection techniques disclosed herein use methane gas as an example of a subject chemical species, the disclosed detection techniques can be used to detect other chemical species in gas and/or aerosol form that substantively impact a subset of spectral bands of the multispectral imagery.

Figure 1:
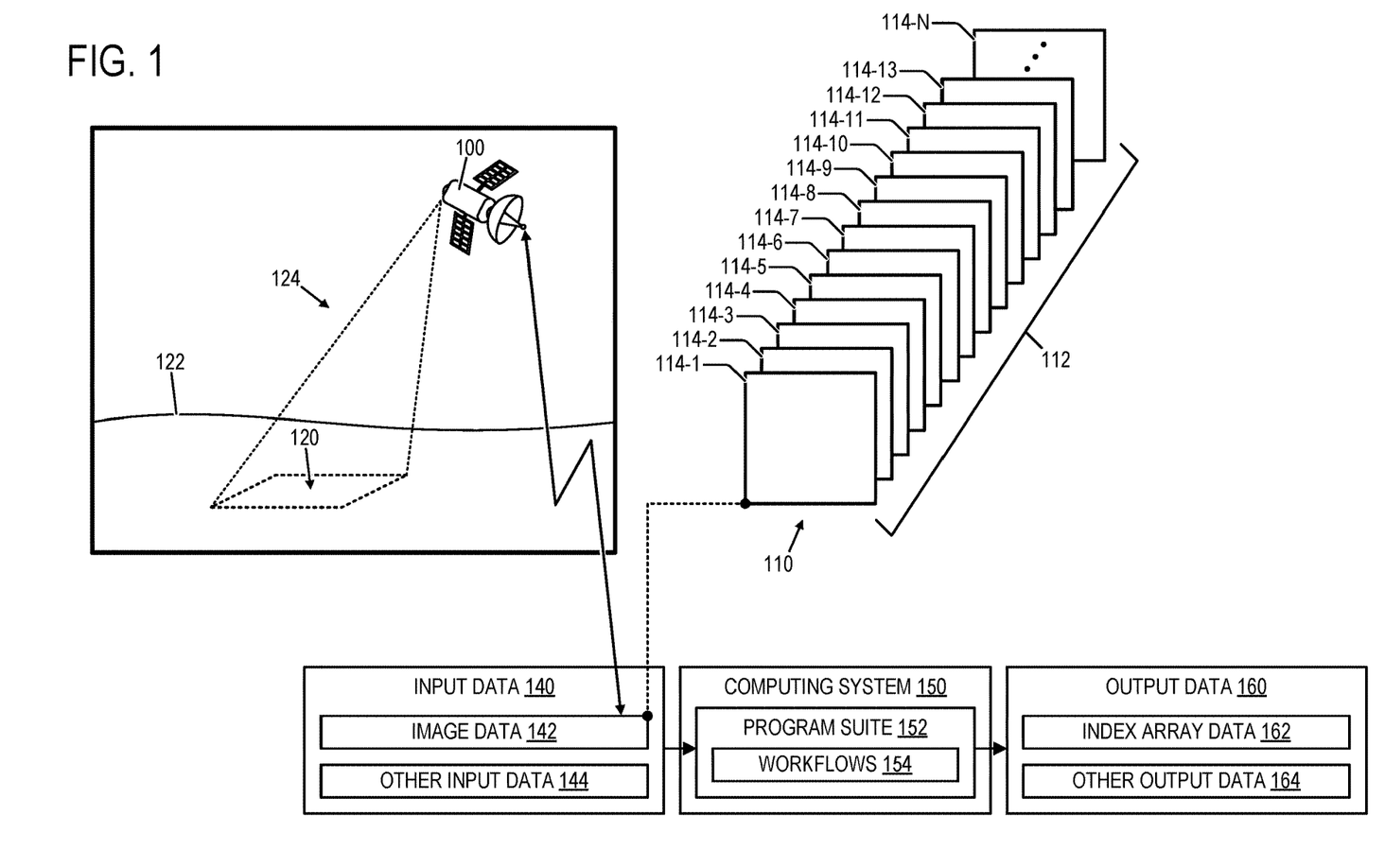
FIG. 1 depicts an example of an aeronautical vehicle capturing multispectral imagery of a geographic region through an atmospheric environment for use by a computing system.

FIG. 1 depicts an example of an aeronautical vehicle 100 capturing multispectral imagery 110 of a geographic region 120 of a planetary surface 122 through an atmospheric environment 124. Aeronautical vehicle 100, for example, may take the form of an orbiting satellite or airborne aircraft having one or more on-board imaging sensors (e.g., cameras and/or other optical sensors) by which multispectral imagery 110 is captured.

Multispectral imagery 110 includes a multispectral image set 112 of geographic region 120. Multispectral image set 112 may include a plurality of band-specific images (represented by the quantity "N") contemporaneously captured by aeronautical vehicle 100 of geographic region 120. The N band-specific images of multispectral image set 112 are represented schematically in FIG. 1 by band-specific image 114-1 through band-specific image 114-N. In this example, the N band-specific images of multispectral image set 112 respectively measure reflected radiance of planetary surface 122 within geographic region 120 in N spectral bands.

As an illustrative example, aeronautical vehicle 100 may take the form of an orbiting satellite of the Sentinel-2 program having an onboard imaging system referred to as the MultiSpectral Instrument (MSI). The MSI, in this example, captures multispectral imagery that measures the Earth's reflected radiance in 13 spectral bands. Examples of the 13 spectral bands of the MSI are described in further detail with reference to FIG. 2A. It will be understood that the techniques disclosed herein can used for multispectral imagery having any suitable quantity and configuration of spectral bands beyond the examples disclosed herein.

Among the N spectral bands of multispectral image set 112, at least one spectral band may be referred to as a sample spectral band that has increased sensitivity to a subject chemical species as compared to other spectral bands of the multispectral image set. For example, band-specific image 114-13 can correspond to spectral band 12 of FIG. 2A, which exhibits increased sensitivity to methane, in the form of reduced or attenuated band-specific intensity (due to absorption), as compared to other spectral bands of FIG. 2A.

Multispectral imagery 110 may further include a time-based series of multispectral image sets (of which multispectral image set 112 is an example) of diverse geographic regions and/or revisited geographic regions captured over time by aeronautical vehicle 100 as the vehicle proceeds along an orbital path or flight path. Thus, for a given geographic region being imaged, a corresponding multi spectral image set of a plurality of band-specific images can be used to identify a subject chemical species within the associated atmospheric environment. Multiple multispectral image sets of the same geographic region (e.g., 120) captured at different times can provide a time-based view of atmospheric and/or surface conditions for the geographic region.

Multispectral imagery 110, including multispectral image set 112, can be represented by image data 142. Image data 142 may include an array of band-specific intensity values for each band-specific image of multispectral image set 112. For example, each band-specific image (114-1 through 114-N) of multispectral image set 112 may include a two-dimensional array of pixels having band-specific intensity values for a respective spectral band. Each pixel of a band-specific image may be represented as a vector having a position in a first dimension of the image, a position in a second dimension that is orthogonal to the first dimension of the image, and a band-specific intensity value for that pixel.

Within FIG. 1, image data 142 is received by a computing system 150 as input data 140. As described in further detail with reference to FIG. 3, input data 140 received by computing system 150 can include a variety of other input data 144 in addition to image data 142. Within the example of FIG. 1, computing system 150 implements a program suite 152 having one or more data processing workflows 154 to generate output data 160 based on input data 140. Output data 160 may include index array data 162 for a subject chemical species of interest, and other output data 164. As an example, index array data 162 can represent an index array of intensity variance values identifying a similarity between a sample spectral band for the subject chemical species and a group of reference spectral bands that exhibit lower sensitivity or insensitivity to the subject chemical species.

Figure 2A:
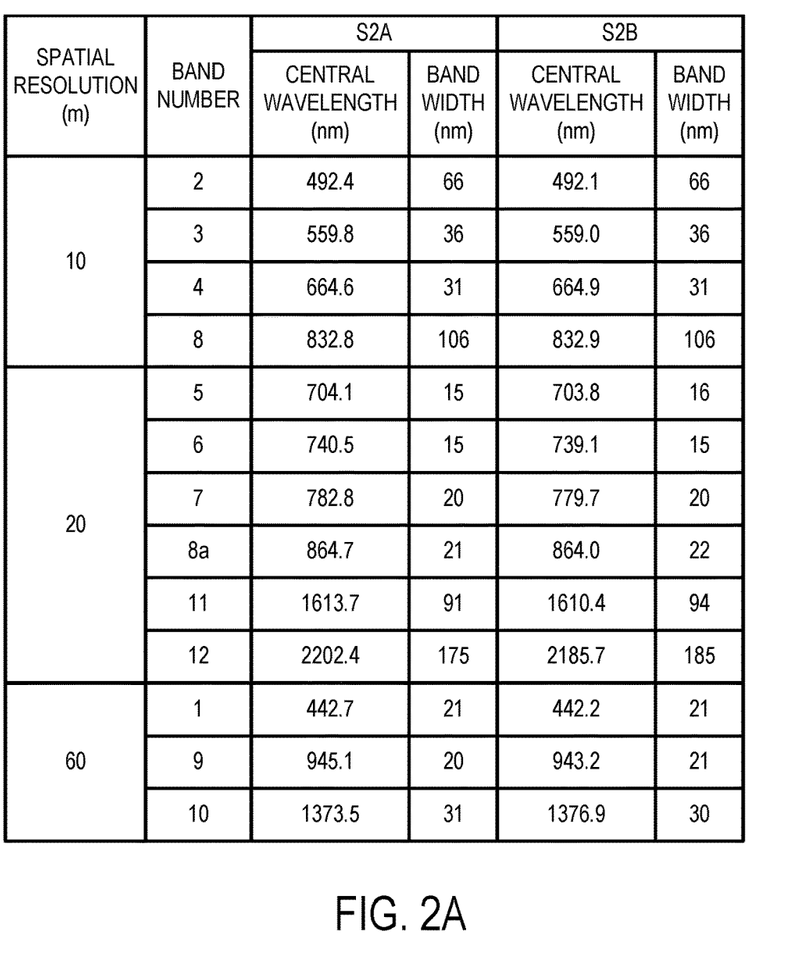
FIG. 2A depicts a table of two sets of example spectral bands that may be measured by multispectral imagery.

FIG. 2A depicts a table of two sets of 13 spectral bands of the Sentinel-2 program's MSI. A first set of 13 spectral bands designated as S2A (a first satellite) are identified by a corresponding band number and are each defined by a central wavelength and bandwidth for that central wavelength. A second set of 13 spectral bands designated as S2B (a second satellite) are also identified by a corresponding band number and are each defined by a central wavelength and bandwidth. A spatial resolution is also identified for each band number within the table of FIG. 2A. For example, a spatial resolution of 10 m may refer to each pixel of the band-specific image representing approximately a 10 m×10 m region. The detection techniques disclosed herein can use multispectral imagery having diverse spatial resolution across spectral bands, such as the 10 m, 20 m, and 60 m resolutions identified by FIG. 2A. As previously described with reference to FIG. 1, the 13 spectral bands identified by the table of FIG. 2A are example spectral bands that can correspond to band-specific image 114-1 through band-specific image 114-13 of multispectral image set 112.

Figure 2B:
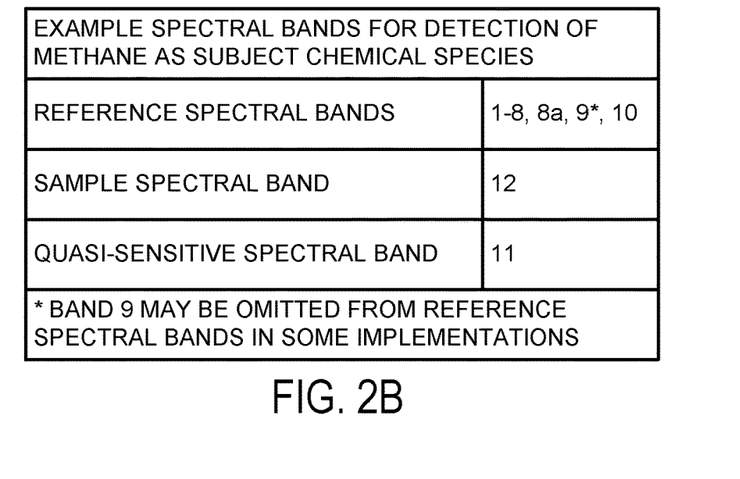
FIG. 2B depicts a table of the spectral bands of FIG. 2A with specific bands designated for the detection of methane as a subject chemical species.

FIG. 2B depicts a table of the spectral bands of FIG. 2A with specific bands designated for the detection of methane gas as a subject chemical species. In this example, bands 1-8, 8a, 9*, and 10 is designated as reference spectral bands; band 12 is designated as a sample spectral band due to its increased sensitivity to methane gas in the form of reduced or attenuated band-specific intensity; and band 11 is designated as a quasi-sensitive spectral band due to less attenuation band-specific intensity in the presence of methane gas as compared to the sample spectral band. In this example, the sample spectral band has a central wavelength within a range of 2093.2 nm-2289.9 nm identified for band 12. A quasi-sensitive spectral band (e.g., band 11) may exhibit some sensitivity to the subject chemical species, but is not designated as either a reference spectral band or a sample spectral band. Within this example, band 9 which exhibits increased sensitivity to water vapor in the atmospheric environment may be omitted from the reference spectral bands in at least some implementations. While methane gas is provided as an example of a subject chemical species, it will be understood that other gases and/or aerosols may be detected within an atmospheric environment via spectral bands that exhibit a diverse range of sensitivity to the subject chemical species of interest.

Figure 3:
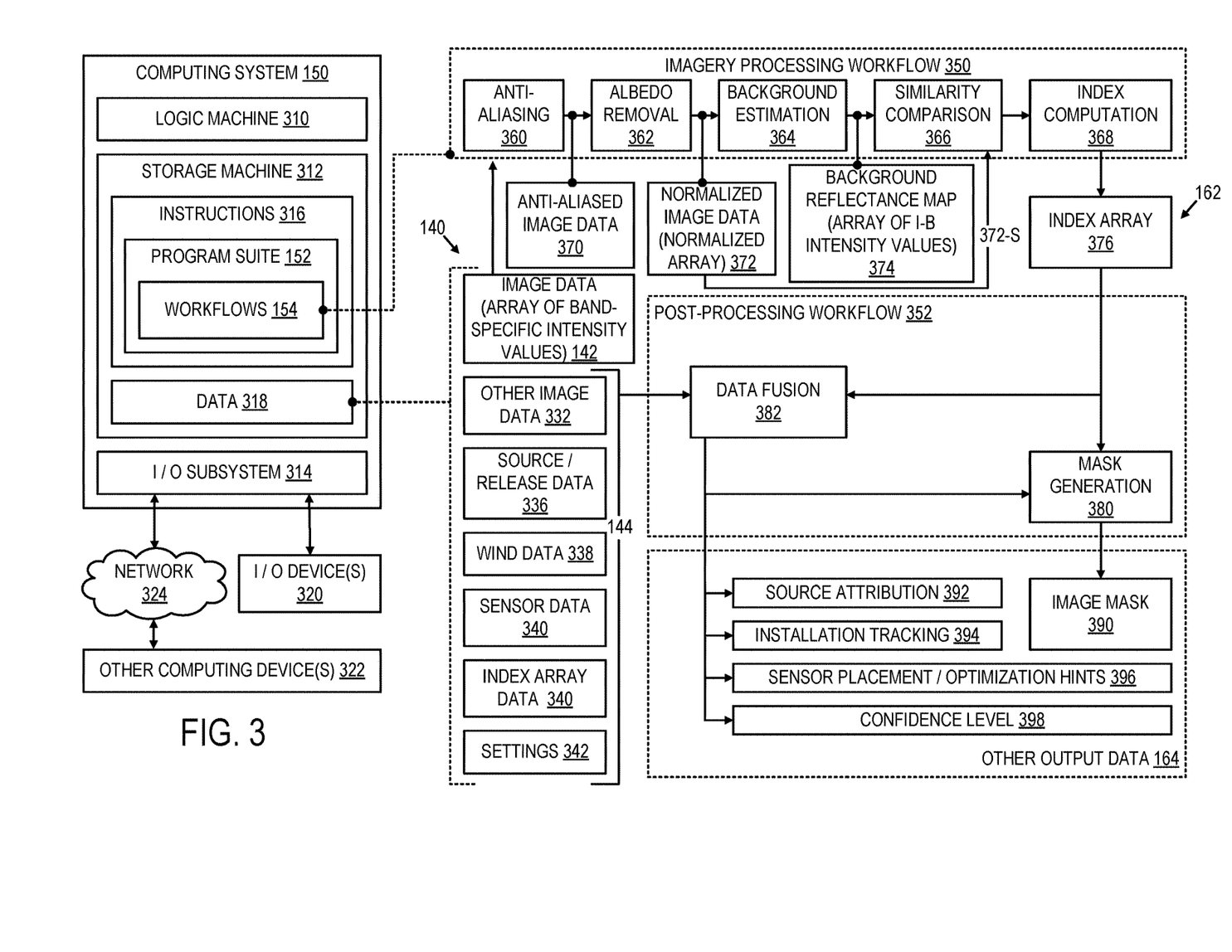
FIG. 3 depicts an example computing environment, including additional features of the example computing system and processing workflow of FIG. 1.

FIG. 3 depicts an example computing environment, including additional features and processing workflow of example computing system 150 of FIG. 1. Computing system 150 may include one or more computing devices having a co-located and/or distributed configuration. Computing system 150 in this example includes a logic machine 310, a storage machine 312, and an input/output (I/O) subsystem 314 depicted schematically in FIG. 3.

Logic machine 310 may include one or more processor devices, as an example. Storage machine 312 may include one or more data storage devices, as an example. Within FIG. 3, storage machine 312 is schematically depicted having instructions 316 stored thereon that are executable by logic machine 310 to perform the various operations and methods described herein. For example, instructions 316 may include previously described program suite 152 of FIG. 1. Program suite 152 may include one or more computer-executable programs having one or more data processing workflows 154. Storage machine 312 further includes data 318 stored thereon, which may include input data 140 received by computing system 150 and output data 160 generated by computing system 150, as well as other types of data generated by program suite 152 implementing data processing workflows 154.

Computing system 150 can receive input data and/or provide output data to other devices via I/O subsystem 314. As an example, I/O devices 320 enable users to interact with computing system 150. As another example, computing system 150 may communicate with other computing devices 322 via a communications network 324, which can refer to a wide area communications network such as the Internet.

In one example, computing system 150 may be located off-board the aeronautical vehicle that captures the multispectral imagery. In this configuration, image data 142 may be received from the aeronautical vehicle via a communications network (e.g., 324). In this scenario, the image data may traverse one or more other computing devices (e.g., 322). In another example, some or all components of computing system 150 may be located on-board the aeronautical vehicle that captures the multispectral imagery to provide on-board processing of image data and/or detection of a subject chemical species.

Examples of input data 140 are depicted schematically in FIG. 3, including image data 142 of FIG. 1, other image data 332 (e.g., visible spectrum imagery and/or higher resolution imagery obtained from various sources); source and/or release data 336 identifying locations and/or physical structures of known gas and/or aerosol sources and/or releases; wind data 338 identifying wind direction and/or magnitude at specified locations and/or regions; sensor data 340 which may include measurements (e.g., concentration measurements of a subject chemical species) obtained from ground-based sensors within a geographic region; index array data 340 representing previously generated index arrays for the subject chemical species; and user settings 342 which enable operator users of program suite 152 to adjust operating parameters for workflows 154.

In the example of FIG. 3, workflows 154 include an imagery processing workflow 350 that receives and processes image data 142 to generate index array data 162. Imagery processing workflow 350 comprises a variety of workflow components, including anti-aliasing 360, albedo removal 362, background estimation 364, similarity comparison 366, and index computation 368. An example method of imagery processing workflow is described in further detail with reference to FIG. 4. As a brief introduction to workflow components, in at least some examples, image data 142 may be obtained by computing system 150 as spatially aliased image data. Anti-aliasing 360 may be performed on aliased image data to obtain anti-aliased image data 370. Albedo removal 362 may be performed on anti-aliased image data 370 (or image data 142 that is initially not spatially aliased) to generate normalized image data 372 as a normalized array of band-specific intensity values for each of the plurality of spectral bands that removes the albedo background from the image data across the spectral bands. Background estimation 364 may be performed on normalized image data 372 of reference spectral bands to generate a background reflectance map 374. As an example, background reflectance map 374 includes an array of inter-band intensity values in which each inter-band intensity value represents a filtered combination (e.g., median or average value) of band-specific intensity values of the normalized arrays for a grouped subset (e.g., neighbors) of the plurality of reference spectral bands. Similarity comparison 366 may be performed using background reflectance map 374 and normalized image data 372 of a sample spectral band 372-S, and index computation 368 may be performed to generate index array 376 that includes intensity variance values between the sample spectral band and background reflectance map 374. Index array 376 may be stored as index array data 340.

Workflows 154 may further include a post-processing workflow 352 that may use index array data 162 (including index array 376) as an input in combination with other input data 144 to generate a variety of other output data 164. As an example, mask generation 380 of post-processing workflow 352 may be performed on index array 376 using a threshold (e.g., of setting 342) to generate an image mask 390 representing a binary classification of pixels as either positively detecting the subject chemical species or not detecting the subject chemical species.

Additionally or alternatively, data fusion 382 of post-processing workflow 352 may be performed using other input data 144 in combination with index array 376 to provide input to mask generation 380. For example, a threshold used by mask generation 380 to generate image mask 390 may be based on data fusion 382 using other input data 144.

Additionally or alternatively, data fusion 382 of post-processing workflow 352 may be performed using other input data 144 in combination with index array 376 and/or image mask 390 to generate other output data 164, including source attribution 392, installation tracking 394, sensor placement and/or optimization hints 396, and confidence level 398. In this example, source attribution 392 can refer to attributing a particular location or physical structure as a source of the subject chemical species; installation tracking 394 can refer to a time-based tracking of a release of the subject chemical species; sensor placement and/or optimization hints 396 can refer to or inform specific sensor types (e.g., sensors configured to measure the subject chemical species) and/or positioning of such sensors within a geographic region; and confidence level 398 can refer to a level of confidence attributed to outputs such as index array 376, image mask 390, source attribution 392, installation tracking 394, and sensor placement and/or optimization hints 396.

Data fusion 382 may be implemented as one or more rule sets (e.g., defined by settings 342) and/or one or more parametrized classifiers using other input data 144, index array 376, and/or image mask 390 as inputs. As an example, data fusion 382 may be performed using a trained machine learning model of program suite 152. A trained machine learning model may be trained using labeled training data (e.g., labels may be defined in settings 342) within other input data 144, index array 376, and/or image mask 390, as an example. Such training may be user-supervised in at least some examples.

For a given set of image data 142, program suite 152 may associate image data 142 (e.g., via an identifier) with the various output data and/or intermediate data generated by workflows 154 within a data store of data 318, including data items 370, 372, 374, 376, 390, 392, 394, 396, and 398 from which users may access and further process such data.

Figure 4:
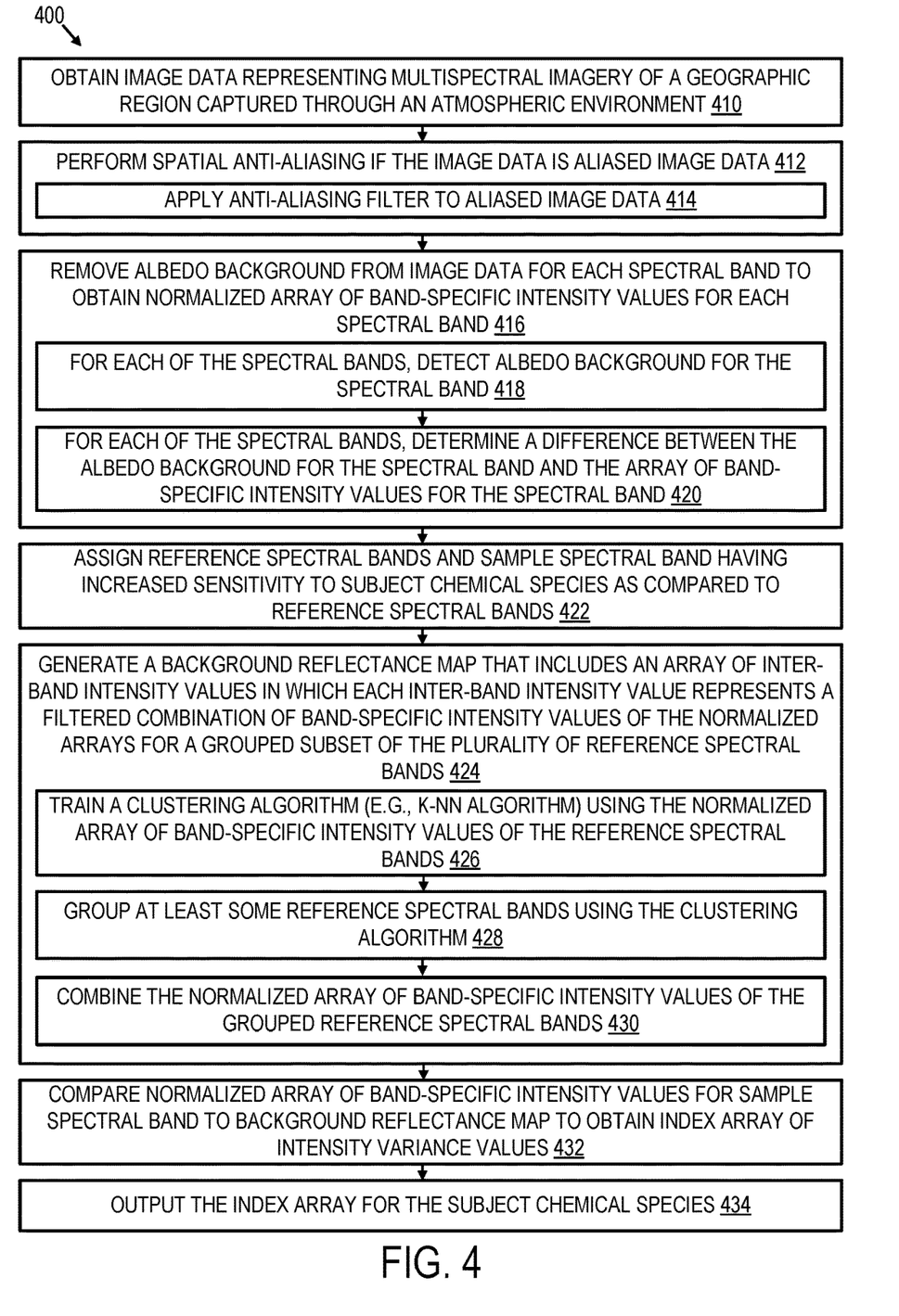
FIG. 4 is a flow diagram depicting an example method for optically detecting a subject chemical species within an atmospheric environment.

FIG. 4 is a flow diagram depicting an example method 400 for optically detecting a subject chemical species within an atmospheric environment. As an example, method 400 may be performed by a computing system, such as computing system 150 previously described with reference to FIGS. 1 and 3. For example, method 300 may be performed by computing system 150 executing program suite 152 that implements workflows 154 of FIG. 3.

At 410, the method includes obtaining image data representing multispectral imagery of a geographic region captured through an atmospheric environment. As previously described with reference to FIG. 1, the multispectral imagery may be captured via an aeronautical vehicle, such as a satellite or aircraft, for example. The image data includes an array of band-specific intensity values for each of a plurality of spectral bands, including a plurality of reference spectral bands and a sample spectral band having increased sensitivity to the subject chemical species as compared to the plurality of reference spectral bands. For example, within the context of detecting methane gas within the atmospheric environment, the reference spectral bands can refer to band numbers 1-8, 8a, 9*, and 10 of FIG. 2A, and the sample spectral band can refer to band number 12 of FIG. 2A.

At 412, if the image data obtained at 410 is spatially aliased, the method includes performing spatial anti-aliasing of the aliased image data to obtain anti-aliased image data. As downstream processes on image data compute ratios or differences in values, spatial aliasing can generate significant artifacts that reduce detection accuracy. As an example, spatial anti-aliasing may be performed by applying an anti-aliasing filter (e.g., a Gaussian filter) to the aliased image data at 414.

At 416, the method includes removing albedo background from the image data for each of the plurality of spectral bands to obtain a normalized array of band-specific intensity values for each of the plurality of spectral bands. Surface albedo in rural and urban environments can be a significant influencing parameter in the evaluation of the radiative forcing of the land surface. To reduce the amount of interference, broadband coefficients for albedo retrieval may be used to create an albedo background map that is subtracted from the image data.

As an example, for each of the spectral bands, the method at 418 may include detecting the albedo background (e.g., albedo retrieval) for the spectral band. The method at 420 may further include, for each of the spectral bands, determining a difference between the albedo background for the spectral band and the array of band-specific intensity values for the spectral band, wherein the difference represents the normalized array of band-specific intensity values for the spectral band.

Figure 5A:
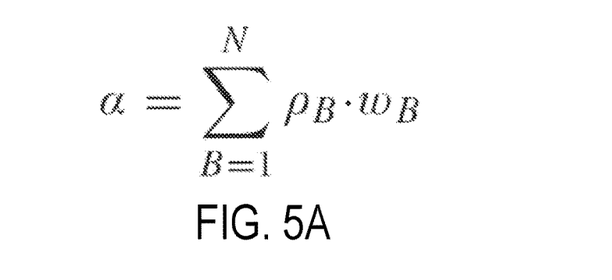
FIGS. 5A and 5B depict equations that may be used as part of albedo background removal.
Figure 5B:
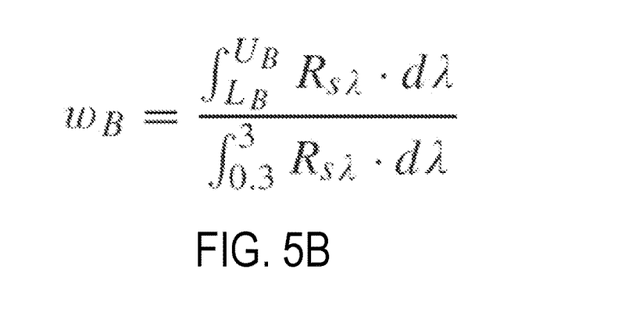

One example of detecting the albedo background by albedo retrieval includes use of an algorithm that utilizes narrow-to-broadband conversion coefficients. Broadband albedo can be defined as a ratio of reflected flux density to incident flux density of the spectrum of incident solar radiation (e.g., 0.3-3 µm). FIG. 5A depicts an example equation in which broadband surface albedo ($\alpha$) can be estimated by integration of reflectance in a narrowband across the spectrum of incident solar radiation. Within the equation of FIG. 5A, $\eta_B$ represents the surface reflectance for a particular spectral band (B). A weighted coefficient ($\omega_B$) for the spectral band (B) of the equation of FIG. 5A may be determined using the equation of FIG. 5B. Within the equation of FIG. 5B, the R term refers to the spectral solar radiation at a particular wavelength at the surface. The $U_B$ term refers to an upper wavelength limit of the particular spectral band (B), and the $L_B$ term refers to a lower wavelength limit of the particular spectral band (B). It will be understood that this albedo estimation technique is one approach for albedo retrieval, and that other suitable techniques may be used.

At 422, the method includes assigning reference spectral bands and a sample spectral band having increased sensitivity to the subject chemical species as compared to the reference spectral bands. As an example, a user input or user settings 342 may be used to specify the sample, reference, and quasi-sensitive spectral bands for a particular chemical species of interest.

At 424, the method includes generating a background reflectance map that includes an array of inter-band intensity values in which each inter-band intensity value represents a filtered combination of band-specific intensity values of the normalized arrays for a grouped subset of the plurality of reference spectral bands. As an example, the filtered combination determined for each inter-band intensity value of the background reflectance map may take the form of the median value or average value of band-specific intensity values of the normalized arrays for the grouped subset of the plurality of reference spectral bands. In this example, each pixel of the background reflectance map includes the median value obtained from the band-specific intensity values of that pixel position within the normalized arrays for the grouped subset. For a chemical species such as methane in which band 11 of FIGS. 2A and 2B has some increased sensitivity to the chemical species, but is not the primary sample spectral band (as compared to band 12), the background reflectance map is not based on the normalized array of band-specific intensity values for the quasi-sensitive spectral band (identified as band 11 in FIG. 2B), in at least some examples.

Flaring (e.g., from combustion) and large light-colored structures can lead to errors in the quantification of chemical species. These features can be identified within a background reflectance map that is removed from the image data for the sample spectral band. Reference spectral bands can be used to find regions that behave similarly and compare the resulting background reflectance map with sample spectral band(s) susceptible to the subject chemical species in terms of reflectance. This approach provides an estimate of the expected median value or average value for comparison to the sample spectral band(s) of interest.

As an example, the method at 424 may include training an unsupervised algorithm (e.g., a clustering algorithm such as a non-parametric, unsupervised version of a K-NN algorithm) at 426; grouping at least some of the reference spectral bands using the clustering algorithm at 428; and combining (e.g., determining a median value or an average value of) the normalized array of the band-specific intensity values of the grouped reference spectral bands at 430 to obtain the background reflectance map. In at least some examples, the background reflectance map generated at method 424 has the same resolution as the normalized array of band-specific intensity values for the sample spectral band.

Within the context of a K-NN algorithm, training at 426 includes loading the vector (e.g., two-dimensional position and normalized band-specific intensity value) for each pixel of the normalized array into a vector space domain for each reference spectral band. As an example, the K term may be set at a value of 6. However, other suitable K term values may be used. Furthermore, it will be understood that other clustering and/or grouping techniques may be used to group reference spectral bands to obtain a background reflectance map.

At 432, the method includes comparing the normalized array of band-specific intensity values for the sample spectral band to the background reflectance map to obtain an index array of intensity variance values. The index array includes an intensity variance value for each pixel that represents a variance of a value of a corresponding pixel of the normalized array of band-specific intensity values for the sample spectral band relative to a corresponding pixel of the background reflectance map. As an example, the intensity variance value of each pixel of the index array takes the form of a relative difference between the pixel value of the normalized array and the median value or the average value of the neighbors (the grouped subset of the plurality of reference spectral bands). Each pixel of the index array may be computed using the relationship: $(x-m)/m$, wherein "x" is the band-specific intensity value at the pixel position of the normalized array for the sample spectral band, and "m"

is the median value or average value for the corresponding pixel position within the background reflectance map of the neighbors (the grouped subset of plurality of reference spectral bands. Thus, the comparison performed at operation 432 may be on a pixel-by-pixel basis to obtain the index array. As an example, the index array obtained from operation 432 represents an index image having the same resolution as the normalized array of band-specific intensity values for the sample spectral band.

At 434, the method includes outputting the index array for the subject chemical species. For example, the index array may be displayed to a user, stored in data storage, and/or provided to a downstream process for further processing as described with reference to FIG. 3. Low similarity between the background reflectance map and the normalized array of band-specific intensity values for the sample spectral band, as identified by high intensity variance values in the index array, could represent plumes of the subject chemical species (also depending on the confidence level, which may be defined by other fused data as depicted in FIG. 3, for example). For example, prior knowledge that the index array was computed in an area where there is oil and gas infrastructure, which can be seen in high resolution satellite imagery, can be used to inform confidence in the detection of methane gas. Additionally, climatological variables, such as the wind direction and/or magnitude can enhance the confidence level, if the observed plume is dispersed in an orientation along the wind vector.

Figure 6:
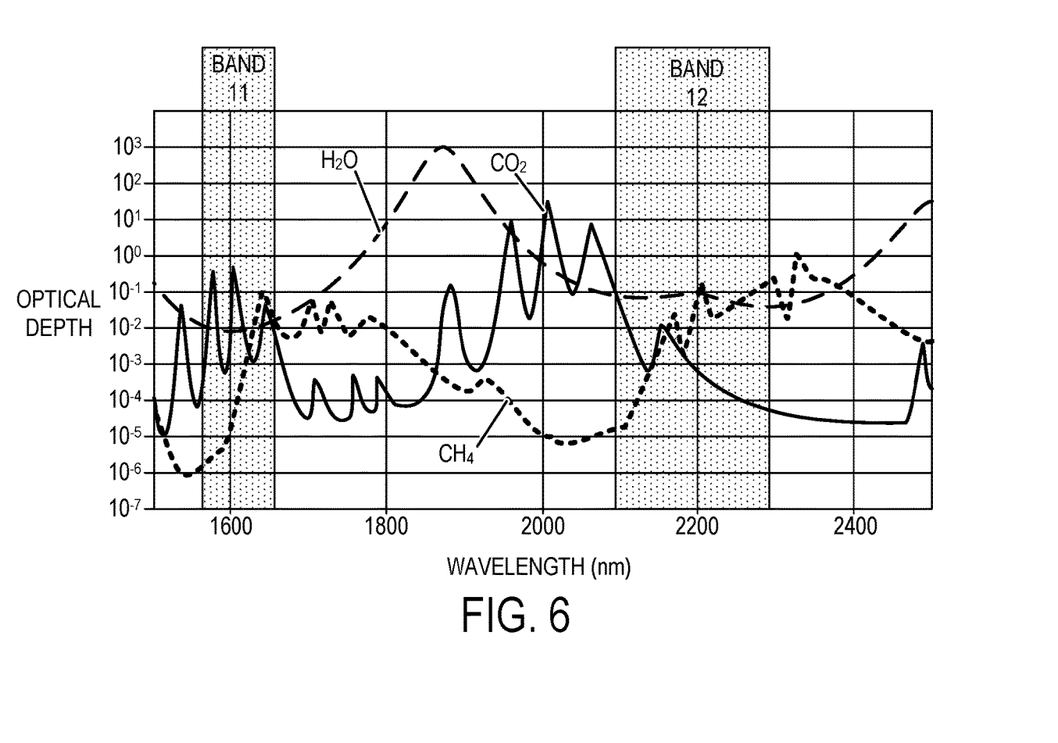
FIG. 6 depicts a graph of optical depth vs. wavelength for various chemical species within an atmospheric environment according to a prophetic example.

FIG. 6 depicts a graph of optical depth vs. wavelength for various chemical species within an atmospheric environment showing a prophetic example of how bands 11 and 12 of FIG. 2A interact with methane. For example, the graph of FIG. 6 shows methane ($CH_4$), carbon dioxide ($CO_2$), and water vapor ($H_2O$) slant column optical depths in the spectral range of 1500-2500 nm. The optical depths in this example refer to absorption line strength. The values provided in FIG. 6 are for US Standard Atmosphere for which surface concentrations are adjusted to 1875 ppb for $CH_4$ and 410 ppm for $CO_2$. The slant optical depth calculation is performed for a solar zenith angle of 40° and satellite viewing angle of 0°. The optical depths in this example have been smoothed for purposes of illustration. The shaded areas in this example represent bands 11 and 12 for Sentinel-2A (solid) and Sentinel-2B (hatched) of FIG. 2A.

In at least some examples, the methods and processes described herein may be tied to a computing system (e.g., 150 of FIGS. 1 and 3) of one or more computing devices. In particular, such methods and processes may be implemented as a computer-application program or service, an application-programming interface (API), a library, and/or other computer-program product.

It will be understood that computing system 150 of FIGS. 1 and 3 is shown in simplified form. Computing system 150 may take the form of one or more personal computers, server computers, tablet computers, network computing devices, aeronautical vehicle-based computing devices, mobile computing devices, and/or other computing devices.

Logic machine 310 of FIG. 3 includes one or more physical devices configured to execute instructions (e.g., 316). For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 312 of FIG. 3 includes one or more physical devices configured to hold instructions executable by the logic machine to implement the methods and processes described herein. When such methods and processes are implemented, the state of storage machine 312 may be transformed—e.g., to hold different data. Storage machine 312 may include removable and/or built-in devices. Storage machine 312 may include optical memory, semiconductor memory (e.g., RAM, EPROM, EEPROM, etc.), and/or magnetic memory, among others. Storage machine 312 may include volatile, nonvolatile, dynamic, static, read/write, read-only, random-access, sequential-access, location-addressable, file-addressable, and/or content-addressable devices.

It will be appreciated that storage machine 312 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 310 and storage machine 312 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

The terms "module," "program," and "engine" may be used to describe an aspect of computing system 150 implemented to perform a particular function. In some cases, a module, program, or engine may be instantiated via logic machine 310 executing instructions held by storage machine 312. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service" may be used to describe an application program executable across multiple user sessions. A service may be available to one or more system components, programs, and/or other services. In some implementations, a service may run on one or more server-computing devices.

When included, a display subsystem of I/O devices 320 or other computing devise 322 of FIG. 3 may be used to present a visual representation of data held by storage machine 312. This visual representation may take the form of a graphical user interface (GUI). As the herein described methods and processes change the data held by the storage machine, and thus transform the state of the storage machine, the state of the display subsystem may likewise be transformed to visually represent changes in the underlying data. The display subsystem may include one or more display devices utilizing virtually any type of technology. Such display devices may be combined with logic machine 310 and/or storage machine 312 in a shared enclosure, or such display devices may be peripheral display devices.

When included, an input subsystem component of I/O subsystem 314, I/O devices 320, and/or other computing devices 322 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, a communication subsystem component of I/O subsystem 314 may be configured to communicatively couple computing system 150 with one or more other computing devices (e.g., 322). This communication subsystem component may include wired and/or wireless communication devices compatible with one or more different communication protocols. As examples, the communication subsystem may be configured for communication via a wireless telephone network, or a wired or wireless local- or wide-area network. In at least some examples, the communication subsystem component may allow computing system 150 to send and/or receive messages to and/or from other devices via a network such as the Internet.

According to an example disclosed herein, a method performed by a computing system for optically detecting a subject chemical species within an atmospheric environment comprises: obtaining image data representing multispectral imagery of a geographic region captured through the atmospheric environment via an aeronautical vehicle, wherein the image data including an array of band-specific intensity values for each of a plurality of spectral bands, including a plurality of reference spectral bands and a sample spectral band having increased sensitivity to the subject chemical species as compared to the plurality of reference spectral bands; removing albedo background from the image data for each of the plurality of spectral bands to obtain a normalized array of band-specific intensity values for each of the plurality of spectral bands; generating a background reflectance map that includes an array of inter-band intensity values in which each inter-band intensity value represents a filtered combination of band-specific intensity values of the normalized arrays for a grouped subset of the plurality of reference spectral bands; comparing the normalized array of band-specific intensity values for the sample spectral band to the background reflectance map to obtain an index array of intensity variance values; and outputting the index array for the subject chemical species. In this example or other examples disclosed herein, the subject chemical species includes methane; and the sample spectral band has a central wavelength within a range of 2093.2 nm-2289.9 nm. In this example or other examples disclosed herein, for each inter-band intensity value, the filtered combination is an average of the band-specific intensity values of the grouped subset of the plurality of reference spectral bands. In this example or other examples disclosed herein, the method further comprises, for each inter-band intensity value of the background reflectance map, classifying the plurality of reference spectral bands into the grouped subset using a clustering algorithm. In this example or other examples disclosed herein, the clustering algorithm is a non-parametric, unsupervised K-NN algorithm; and wherein the method further comprises: training the non-parametric, unsupervised K-NN algorithm with the normalized arrays of the plurality of spectral bands. In this example or other examples disclosed herein, the plurality of spectral bands further includes a quasi-sensitive spectral band having increased sensitivity to the subject chemical species as compared to the plurality of reference spectral bands; and the background reflectance map is not based on the normalized array of band-specific intensity values for the quasi-sensitive spectral band. In this example or other examples disclosed herein, the image data is obtained as spatially aliased image data; and the method further comprises, prior to removing the albedo background, performing spatial anti-aliasing of the spatially aliased image data. In this example or other examples disclosed herein, performing spatial anti-aliasing includes applying a Gaussian filter to the aliased image data. In this example or other examples disclosed herein, removing the albedo background from the image data includes, for each of the plurality of spectral bands: detecting the albedo background for the spectral band; and determining a difference between the albedo background for the spectral band and the array of band-specific intensity values for the spectral band; wherein the normalized array of band-specific intensity values for the spectral band is the difference between the albedo background for the spectral band and the array of band-specific intensity values for the spectral band. In this example or other examples disclosed herein, the method further comprises, comparing each intensity variance value of the index array to a variance threshold to obtain an image mask that distinguishes intensity variance values that are less than the variance threshold from other intensity variance values that are greater than the variance threshold; and outputting the image mask.

According to another example disclosed herein, a computing system for optically detecting a subject chemical species within an atmospheric environment comprises: a logic machine; and a storage machine having instructions stored thereon executable by the logic machine to: obtain image data representing multispectral imagery of a geographic region captured through the atmospheric environment via an aeronautical vehicle, wherein the image data including an array of band-specific intensity values for each of a plurality of spectral bands, including a plurality of reference spectral bands and a sample spectral band having increased sensitivity to the subject chemical species as compared to the plurality of reference spectral bands; remove albedo background from the image data for each of the plurality of spectral bands to obtain a normalized array of band-specific intensity values for each of the plurality of spectral bands; generate a background reflectance map that includes an array of inter-band intensity values in which each inter-band intensity value represents a filtered combination of band-specific intensity values of the normalized arrays for a grouped subset of the plurality of reference spectral bands; compare the normalized array of band-specific intensity values for the sample spectral band to the background reflectance map to obtain an index array of intensity variance values; and output the index array for the subject chemical species. In this example or other examples disclosed herein, the subject chemical species includes methane; and the sample spectral band has a central wavelength within a range of 2093.2 nm-2289.9 nm. In this example or other examples disclosed herein, for each inter-band intensity value, the filtered combination is an average of the band-specific intensity values of the grouped subset of the plurality of reference spectral bands. In this example or other examples disclosed herein, the instructions are further executable by the logic machine to: for each inter-band intensity value of the background reflectance map, classify the plurality of reference spectral bands into the grouped subset using a clustering algorithm. In this example or other examples disclosed herein, the clustering algorithm is a non-parametric, unsupervised K-NN algorithm; and the instructions are further executable by the logic machine to train the non-parametric, unsupervised K-NN algorithm with the normalized arrays of the plurality of spectral bands. In this example or other examples disclosed herein, the plurality of spectral bands further includes a quasi-sensitive spectral band having increased sensitivity to the subject chemical species as compared to the plurality of reference spectral bands; and the background reflectance map is not based on the normalized array of band-specific intensity values for the quasi-sensitive spectral band. In this example or other examples disclosed herein, the image data is obtained as spatially aliased image data; and the instructions are further executable by the logic machine to: prior to removing the albedo background, perform spatial anti-aliasing of the spatially aliased image data. In this example or other examples disclosed herein, performing spatial anti-aliasing includes applying a Gaussian filter to the aliased image data. In this example or other examples disclosed herein, the instructions are further executable by the logic machine to remove the albedo background from the image data by, for each of the plurality of spectral bands: detecting the albedo background for the spectral band; and determining a difference between the albedo background for the spectral band and the array of band-specific intensity values for the spectral band; wherein the normalized array of band-specific intensity values for the spectral band is the difference between the albedo background for the spectral band and the array of band-specific intensity values for the spectral band. In this example or other examples disclosed herein, the instructions are further executable by the logic machine to: compare each intensity variance value of the index array to a variance threshold to obtain an image mask that distinguishes intensity variance values that are less than the variance threshold from other intensity variance values that are greater than the variance threshold; and output the image mask.

According to an example disclosed herein, a computing system for optically detecting a subject chemical species within an atmospheric environment comprises: a storage machine having instructions stored thereon executable by a logic machine to: obtain image data representing multispectral imagery of a geographic region captured through the atmospheric environment via an aeronautical vehicle, the image data including an array of band-specific intensity values for each of a plurality of spectral bands, including a plurality of reference spectral bands and a sample spectral band having increased sensitivity to the subject chemical species as compared to the plurality of reference spectral bands; perform spatial anti-aliasing of the image data; remove albedo background from the image data following spatial anti-aliasing for each of the plurality of spectral bands to obtain a normalized array of band-specific intensity values for each of the plurality of spectral bands; generate a background reflectance map that includes an array of inter-band intensity values in which each inter-band intensity value represents a filtered combination of band-specific intensity values of the normalized arrays for a grouped subset of the plurality of reference spectral bands; compare the normalized array of band-specific intensity values for the sample spectral band to the background reflectance map to obtain an index array of intensity variance values; compare each intensity variance value of the index array to a variance threshold to obtain an image mask that distinguishes intensity variance values that are less than the variance threshold from other intensity variance values that are greater than the variance threshold; and output the image mask. In this example or other examples disclosed herein, the plurality of spectral bands further includes a quasi-sensitive spectral band having increased sensitivity to the subject chemical species as compared to the plurality of reference spectral bands; and wherein the background reflectance map is not based on the normalized array of band-specific intensity values for the quasi-sensitive spectral band.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method performed by a computing system for optically detecting a subject chemical species within an atmospheric environment, the method comprising:
    obtaining image data representing multi spectral imagery of a geographic region captured through the atmospheric environment via an aeronautical vehicle,
        the image data including an array of band-specific intensity values for each of a plurality of spectral bands, including a plurality of reference spectral bands and a sample spectral band having increased sensitivity to the subject chemical species as compared to the plurality of reference spectral bands;
    removing albedo background from the image data for each of the plurality of spectral bands to obtain a normalized array of band-specific intensity values for each of the plurality of spectral bands;
    generating a background reflectance map that includes an array of inter-band intensity values in which each inter-band intensity value represents a filtered combination of band-specific intensity values of the normalized arrays for a grouped subset of the plurality of reference spectral bands;
    comparing the normalized array of band-specific intensity values for the sample spectral band to the background reflectance map to obtain an index array of intensity variance values; and
    outputting the index array for the subject chemical species.

2. The method of claim 1, wherein the subject chemical species includes methane; and
wherein the sample spectral band has a central wavelength within a range of 2093.2 nm-2289.9 nm.

3. The method of claim 1, wherein for each inter-band intensity value, the filtered combination is an average of the band-specific intensity values of the grouped subset of the plurality of reference spectral bands.

4. The method of claim 1, further comprising:
for each inter-band intensity value of the background reflectance map, classifying the plurality of reference spectral bands into the grouped subset using a clustering algorithm.

5. The method of claim 4, wherein the clustering algorithm is a non-parametric, unsupervised K-NN algorithm; and wherein the method further comprising:
training the non-parametric, unsupervised K-NN algorithm with the normalized arrays of the plurality of spectral bands.

6. The method of claim 1, wherein the plurality of spectral bands further includes a quasi-sensitive spectral band having increased sensitivity to the subject chemical species as compared to the plurality of reference spectral bands; and
wherein the background reflectance map is not based on the normalized array of band-specific intensity values for the quasi-sensitive spectral band.

7. The method of claim 1, wherein the image data is obtained as spatially aliased image data; and
wherein the method further comprises, prior to removing the albedo background, performing spatial anti-aliasing of the spatially aliased image data.

8. The method of claim 7, wherein performing the spatial anti-aliasing includes applying a Gaussian filter to the aliased image data.

9. The method of claim 1, wherein removing the albedo background from the image data includes, for each of the plurality of spectral bands:
detecting the albedo background for the spectral band; and
determining a difference between the albedo background for the spectral band and the array of band-specific intensity values for the spectral band;
wherein the normalized array of band-specific intensity values for the spectral band is the difference between the albedo background for the spectral band and the array of band-specific intensity values for the spectral band.

10. The method of claim 1, further comprising:
comparing each intensity variance value of the index array to a variance threshold to obtain an image mask that distinguishes intensity variance values that are less than the variance threshold from other intensity variance values that are greater than the variance threshold; and
outputting the image mask.

11. A computing system for optically detecting a subject chemical species within an atmospheric environment, the computing system comprising:
a logic machine; and
a storage machine having instructions stored thereon executable by the logic machine to:
obtain image data representing multispectral imagery of a geographic region captured through the atmospheric environment via an aeronautical vehicle, the image data including an array of band-specific intensity values for each of a plurality of spectral bands, including a plurality of reference spectral bands and a sample spectral band having increased sensitivity to the subject chemical species as compared to the plurality of reference spectral bands;
remove albedo background from the image data for each of the plurality of spectral bands to obtain a normalized array of band-specific intensity values for each of the plurality of spectral bands;
generate a background reflectance map that includes an array of inter-band intensity values in which each inter-band intensity value represents a filtered combination of band-specific intensity values of the normalized arrays for a grouped subset of the plurality of reference spectral bands;
compare the normalized array of band-specific intensity values for the sample spectral band to the background reflectance map to obtain an index array of intensity variance values; and
output the index array for the subject chemical species.

12. The computing system of claim 11, wherein for each inter-band intensity value, the filtered combination is an average of the band-specific intensity values of the grouped subset of the plurality of reference spectral bands.

13. The computing system of claim 11, wherein the instructions are further executable by the logic machine to:
for each inter-band intensity value of the background reflectance map, classify the plurality of reference spectral bands into the grouped subset using a clustering algorithm.

14. The computing system of claim 13, wherein the clustering algorithm is a non-parametric, unsupervised K-NN algorithm; and
wherein the instructions are further executable by the logic machine to train the non-parametric, unsupervised K-NN algorithm with the normalized arrays of the plurality of spectral bands.

15. The computing system of claim 11, wherein the plurality of spectral bands further includes a quasi-sensitive spectral band having increased sensitivity to the subject chemical species as compared to the plurality of reference spectral bands; and
wherein the background reflectance map is not based on the normalized array of band-specific intensity values for the quasi-sensitive spectral band.

16. The computing system of claim 11, wherein the image data is obtained as spatially aliased image data; and
wherein the instructions are further executable by the logic machine to:
prior to removing the albedo background, perform spatial anti-aliasing of the spatially aliased image data.

17. The computing system of claim 11, wherein the instructions are further executable by the logic machine to remove the albedo background from the image data by, for each of the plurality of spectral bands:
detecting the albedo background for the spectral band; and
determining a difference between the albedo background for the spectral band and the array of band-specific intensity values for the spectral band;
wherein the normalized array of band-specific intensity values for the spectral band is the difference between the albedo background for the spectral band and the array of band-specific intensity values for the spectral band.

18. The computing system of claim 11, wherein the instructions are further executable by the logic machine to:

compare each intensity variance value of the index array to a variance threshold to obtain an image mask that distinguishes intensity variance values that are less than the variance threshold from other intensity variance values that are greater than the variance threshold; and output the image mask.

19. A computing system for optically detecting a subject chemical species within an atmospheric environment, the computing system comprising:

a storage machine having instructions stored thereon executable by a logic machine to:

obtain image data representing multispectral imagery of a geographic region captured through the atmospheric environment via an aeronautical vehicle, the image data including an array of band-specific intensity values for each of a plurality of spectral bands, including a plurality of reference spectral bands and a sample spectral band having increased sensitivity to the subject chemical species as compared to the plurality of reference spectral bands;

perform spatial anti-aliasing of the image data;

remove albedo background from the image data following the spatial anti-aliasing for each of the plurality of spectral bands to obtain a normalized array of band-specific intensity values for each of the plurality of spectral bands;

generate a background reflectance map that includes an array of inter-band intensity values in which each inter-band intensity value represents a filtered combination of band-specific intensity values of the normalized arrays for a grouped subset of the plurality of reference spectral bands;

compare the normalized array of band-specific intensity values for the sample spectral band to the background reflectance map to obtain an index array of intensity variance values;

compare each intensity variance value of the index array to a variance threshold to obtain an image mask that distinguishes intensity variance values that are less than the variance threshold from other intensity variance values that are greater than the variance threshold; and output the image mask.

20. The computing system of claim 19, wherein the plurality of spectral bands further includes a quasi-sensitive spectral band having increased sensitivity to the subject chemical species as compared to the plurality of reference spectral bands; and wherein the background reflectance map is not based on the normalized array of band-specific intensity values for the quasi-sensitive spectral band.

* * * * *